July 14, 1959

S. KLIPPER 2,895,017

D.C. LEVEL SETTER FOR A.C. AMPLIFIERS

Filed Nov. 9, 1953

STANLEY KLIPPER
INVENTOR.

BY Darby + Darby

ATT'YS

United States Patent Office 2,895,017
Patented July 14, 1959

2,895,017

D.C. LEVEL SETTER FOR A.C. AMPLIFIERS

Stanley Klipper, Brooklyn, N.Y., assignor to Polarad Electronics Corporation, Brooklyn, N.Y., a corporation of New York Application November 9, 1953, Serial No. 391,089

4 Claims. (Cl. 179—171)

The present invention relates to the art of alternating current amplification, and is more particularly concerned with providing means for changing the direct current level or average value of the output of alternating current amplifiers without affecting the alternating current signal.

In many circuits, including by way of example but not by way of limitation, circuits for cathode ray oscilloscopes, it becomes important to be able to adjust or vary the average value of an alternating current signal, sometimes termed "setting the D.C. level" of an A.C. signal. Thus, in applying an A.C. signal to a cathode ray oscilloscope, the D. C. level or average value of the signal determines the portion of the oscilloscope screen on which the signal will appear. By a D.C. level setting arrangement, the image on the screen can be moved upwardly or downwardly as may be desired so as to portray the signal to best advantage.

Conventional forms of level setters have been subject to the disadvantage that the variation of D.C. level has been accompanied by changes in the peak-to-peak amplitude of the A.C. signal or in its wave form, both of which are, of course, highly undesirable. Conversely, change in A.C. signal has often changed the D.C. level.

The present invention provides a simple circuit which permits independent adjustment of the D.C. level of an A.C. signal without interaction between the D.C. level and the A.C. output. Thus, a change in the D.C. level has no effect upon the peak-to-peak amplitude or the wave form of the A.C. signal, nor will a change in the amplitude of the A.C. signal have any effect upon the D.C. level.

This is accomplished according to the present invention by a simple level setting arrangement of linear characteristics, whose further objects and advantages will become more fully apparent from consideration of the following description of a preferred form of the invention taken in conjunction with the appended drawings in which—

Figure 1:
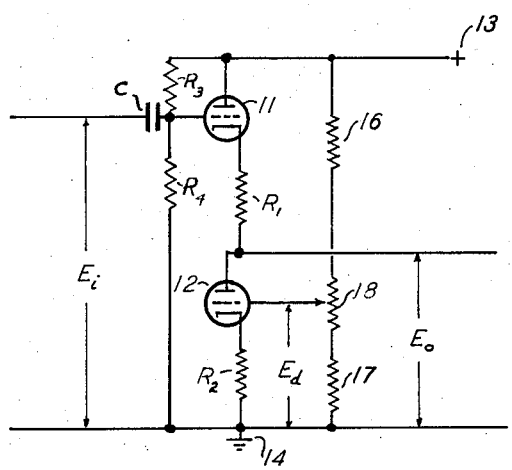
Figure 1 shows a schematic circuit diagram of the present invention.

Referring to Figure 1, the circuit therein shown comprises a pair of electron tubes 11 and 12 illustrated as of the triode type, although not necessarily limited thereto, since any type of grid-controlled tube, preferably having a linear characteristic portion, may be utilized.

Tube 11 has its anode coupled directly to a suitable source 13 of positive potential. The cathode of tube 11 is connected to ground 14 through a series circuit comprising a resistor $R_1$, the anode-cathode path of tube 12 and the resistor $R_2$ connected between the cathode of tube 12 and ground 14. The grid of tube 12 is supplied with an adjustable direct voltage $E_d$ by any suitable means, such as, for example, the voltage divider formed by resistors 16 and 17 and potentiometer 18, all connected in series between source 13 and ground 14. Any other source of adjustable direct voltage may be used here. The input alternating voltage $E_i$ is applied between the grid of tube 11 and ground 14. The output voltage $E_o$ appears between the anode of tube 12 and ground 14.

It will be apparent that the voltage $E_o$ will contain a direct current component by virtue of the voltage-dividing action of tube 11, resistor $R_1$, tube 12 and resistor $R_2$ connected between source 13 and ground 14. At the same time, tube 11 operates as a cathode-loaded tube so that an alternating output voltage appears across the cathode load of tube 11, consisting of resistor $R_1$, tube 12 and resistor $R_2$. The output voltage $E_o$ is taken from a part of this load, namely, across tube 12 and resistor $R_2$.

Tubes 11 and 12 are operated at linear portions of their characteristic. With this condition imposed, the alternating input voltage $E_i$ has no effect upon the average plate current or cathode current of tube 11 and accordingly has no effect upon the D.C. component of the output voltage $E_o$.

Figure 2:
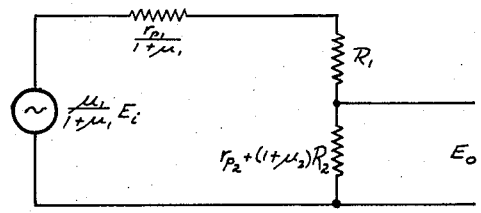
Figure 2 is a schematic circuit diagram of an equivalent circuit useful in explaining the properties of the present invention.

The manner in which the A.C. component of $E_o$ is made independent of $E_d$ is shown by the following analysis, referring to Figure 2, showing the equivalent A.C. circuit of Figure 1.

Letting $\mu_1$ and $\mu_2$ be the respective amplification factors of tubes 11 and 12, and $r_{p1}$ and $r_{p2}$ their plate resistances. Then (1) $\quad E_o = \dfrac{\mu_1}{1+\mu_1} E_i \dfrac{r_{p2}+R_2(1+\mu_2)}{r_{p2}+R_2(1+\mu_2)+R_1+\dfrac{r_{p1}}{1+\mu_1}}$ If $\mu_1$ and $\mu_2$ are both selected to be large compared to unity (that is, 10 or more), and taking $$\frac{1}{g_m} = \frac{r_p}{\mu}$$

Then (2) $\quad E_o = \dfrac{E_i}{1+\dfrac{R_1+\dfrac{1}{g_{m_1}}}{\mu_2\left(R_2+\dfrac{1}{g_{m_2}}\right)}}$ By letting $g_{m_1} = g_{m_2}$ and $R_1 = R_2$,
This becomes (3) $\quad E_o = \dfrac{E_i}{1+\dfrac{1}{\mu_2}}$ and, since $\mu_2$ is large compared to unity, $$E_o \doteq E_i$$

This analysis shows that if the transconductances $g_m$ of tubes 11 and 12 are the same, and if $R_1$ is equal to $R_2$, then the alternating component of the output voltage $E_o$ will be equal to the input voltage $E_i$. These requirements are easily met, since both tubes 11 and 12 operate with the same current, and the transconductance $g_m$ is directly proportional to the current. Hence by choosing tubes of substantially the same characteristics, and making $R_1$ equal to $R_2$, the output voltage is made equal to the input voltage, and is hence independent of the D.C. level.

From another viewpoint, and considering Equation 2 further, $R_1$ can be made much greater than $1/g_{m_1}$ and $R_2$ can be made much greater than $1/g_{m_2}$. Then Equation 2 becomes the following:

(4) $\quad E_o \doteq E_i \dfrac{1}{1+\dfrac{R_1}{\mu_2 R_2}}$

Here again, by making $\mu_2 R_2$ much greater than $R_1$, $E_o$ becomes substantially equal to $E_1$ as desired. This latter condition is, of course, much simpler to meet than the conditions in the first analysis given above.

By imposing either of these sets of conditions, the output alternating voltage becomes independent of the D.C. level; similarly the D.C. level is independent of the alternating voltage, and by suitable adjustment of the potentiometer 18 any desired D.C. level can be imposed upon the input A.C. signal, which is substantially unchanged in passing through the circuit of Figure 1.

Accordingly, this circuit of Figure 1 provides a simple and effective means for adjustably controlling the D.C. level or average value of an A.C. signal without effect upon the A.C. signal and independently of any variations in the D.C. signal.

In the above, it will be understood that the term A.C. signal is intended to apply to any varying amplitude current or voltage signal, whether actually alternating or not, and regardless of its wave form, frequency, polarity or other characteristics.

It will be understood that the above description is intended to be illustrative only, since other circuits can be devised within the spirit of the present invention, which is therefore defined solely by the appended claims.

What is claimed as the invention is:

1. A D.C. level setter for A.C. signals comprising a pair of linear characteristic grid-controlled electron tubes having their anode-cathode paths in series, a source of positive potential coupled to the anode of one of said tubes, a resistor coupled between the cathode of the other of said tubes and ground, a second resistor coupled between the cathode of said one tube and the anode of said other tube, an input circuit coupled between the grid of said one tube and ground for applying an alternating current signal to said grid, an adjustable unvarying positive bias coupled to the grid of said other tube, and a pair of output terminals coupled respectively to the anode of said other tube and to ground, the amplification factor of said other tube being greater than the ratio of the resistances of said second resistor to that of said first resistor, whereby the varying component of said output voltage appearing at said output terminals is substantially equal to that of the input voltage applied to said input circuit and is independent of the direct current level of said output voltage.

2. A D.C. level setter circuit for varying input signals comprising a first tube having a linear characteristic portion and having a cathode and anode and at least one control grid, a second tube having a linear characteristic portion and also having an anode and cathode and at least one control grid, a first resistor connecting said second tube anode to said first tube cathode, a second resistor connected between said second tube cathode and ground, a source of positive potential connected to said first tube anode, a source of adjustable direct voltage connected to said second tube grid, an input circuit connected to said first tube grid and adapted to have an A.C. signal applied thereto, and an output circuit connected between said second tube anode and ground, the product of resistance of said second resistor and the amplification factor of said second tube being much greater than the resistance of said first resistor.

3. A D.C. level setter circuit for varying signals comprising a first tube having a linear characteristic portion and having a cathode and anode and at least one control grid, a second tube having a linear characteristic portion and also having an anode and cathode and at least one control grid, means connecting said second tube anode to said first tube cathode, a resistor having one terminal connected to said second tube cathode and having its other terminal at ground potential, a source of positive potential connected to said first anode, a source of adjustable unvarying voltage connected to said second grid to adjust the direct current component of said circuit, an input circuit connected to said first tube grid and adapted to have an A.C. signal applied thereto, and an output circuit connected between said second anode and ground, said connecting means between said second tube anode and said first tube cathode comprising a second resistor, the resistances of said first and second resistors being equal and the transconductances of said first and second tubes being equal, and the amplification factor of said second tube being much greater than unity.

4. A circuit as in claim 2, wherein the ratio of resistance of said second resistor to that of said first resistor is much smaller than the amplification factor of said second tube.

References Cited in the file of this patent
UNITED STATES PATENTS

| | | |
|---|---|---|
| 2,356,733 | Banker | Aug. 29, 1944 |
| 2,592,193 | Saunders | Apr. 8, 1952 |
| 2,613,286 | Hare | Oct. 7, 1952 |
| 2,662,938 | Goldstine | Dec. 15, 1953 |
| 2,679,029 | Jose | May 18, 1954 |

FOREIGN PATENTS

| | | |
|---|---|---|
| 565,870 | Great Britain | Dec. 1, 1944 |

OTHER REFERENCES

Publication, Electronics, "A Stable Instrument Amplifier," by Peter G. Sulzer, March 1950, vol. 23, issue No. 3, page 116, 179–171 (1D).